United States Patent
Elmasry et al.

(10) Patent No.: US 11,405,795 B2
(45) Date of Patent: Aug. 2, 2022

(54) SPECTRUM INFORMATION FUSION FOR DYNAMIC SPECTRUM ACCESS OF HEIRARCHICAL HETEROGENEOUS WIRELESS NETWORKS

(71) Applicant: Rockwell Collins, Inc., Cedar Rapids, IA (US)

(72) Inventors: George F. Elmasry, San Marcos, CA (US); Thomas L. Tapp, Cedar Rapids, IA (US); James A. Stevens, Lucas, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 26 days.

(21) Appl. No.: 17/148,381

(22) Filed: Jan. 13, 2021

(65) Prior Publication Data

US 2021/0306861 A1   Sep. 30, 2021

Related U.S. Application Data

(60) Provisional application No. 63/000,641, filed on Mar. 27, 2020.

(51) Int. Cl.
*H04W 16/14*   (2009.01)
*H04W 16/32*   (2009.01)
(Continued)

(52) U.S. Cl.
CPC .......... *H04W 16/14* (2013.01); *H04W 16/32* (2013.01); *H04W 24/10* (2013.01); *H04W 88/16* (2013.01); *H04W 84/18* (2013.01)

(58) Field of Classification Search
CPC ..... H04W 16/14; H04W 16/32; H04W 24/10; H04W 88/16; H04W 84/18
See application file for complete search history.

(56) References Cited

U.S. PATENT DOCUMENTS 7,787,426 B2   8/2010   Seidel et al.
8,014,783 B2   9/2011   Seidel et al.
(Continued)

FOREIGN PATENT DOCUMENTS

IN   1435KOLNP2011 A   8/2016
KR   1020150019532 A   2/2015
(Continued)

OTHER PUBLICATIONS

Dos Santos, Paulo M.R. et al., "Self-Organized Common Control Channel Design for Cognitive Radio Ad Hoc Networks", 2013 IEEE 24th International Symposium on Personal, Indoor and Mobile Radio Communications: Mobile and Wireless Networks, 6 pages.

*Primary Examiner* — Joshua L Schwartz (74) *Attorney, Agent, or Firm* — Suiter Swantz pc llo (57) ABSTRACT

A large scale hierarchical and heterogeneous network, and specifically mobile ad-hoc networks (MANETs), derive content elements from a plurality of informational data points via spectrum fusion at each hierarchical level. Content elements may be derived via fusion of information data from peer nodes and from content elements from lower hierarchical levels. Content elements are propagated up for further abstraction at higher hierarchical levels. Each content element is tagged with a node location and external reference direction. The node location and external reference direction facilitate fusion are each hierarchical level where the deriving node is receiving content elements from a plurality of different nodes.

15 Claims, 10 Drawing Sheets

(51) Int. Cl.
  *H04W 88/16* (2009.01)
  *H04W 84/18* (2009.01)
  *H04W 24/10* (2009.01)

(56) References Cited

U.S. PATENT DOCUMENTS

| | | |
|---|---|---|
| 8,155,127 B2 | 4/2012 | Seidel et al. |
| 8,289,907 B2 | 10/2012 | Seidel et al. |
| 8,644,290 B2 | 2/2014 | Chou et al. |
| 8,654,704 B2 | 2/2014 | Kwon et al. |
| 10,869,200 B1 * | 12/2020 | Huang .................. H04W 16/06 |
| 10,945,261 B2 * | 3/2021 | Wu .......................... H04L 47/80 |
| 2008/0112428 A1 | 5/2008 | Seidel |
| 2010/0150120 A1 | 6/2010 | Schlicht et al. |

FOREIGN PATENT DOCUMENTS

| | | | |
|---|---|---|---|
| WO | 2012048090 A3 | 10/2012 | |
| WO | WO-2020256706 A1 * | 12/2020 | |

* cited by examiner

SPECTRUM INFORMATION FUSION FOR DYNAMIC SPECTRUM ACCESS OF HEIRARCHICAL HETEROGENEOUS WIRELESS NETWORKS

PRIORITY

The present application claims the benefit under 35 U.S.C. § 119(e) of U.S. Provisional App. No. 63/000,641 (filed Mar. 27, 2020), which is incorporated herein by reference.

BACKGROUND

Dynamic networks, such as mobile ad-hoc networks (MANETs), may utilize spectrum sensors to collect spectrum sensing information at the different network's hierarchical level. Such sensors produce informational data points related to the utilized spectrum (for example, interference at a specific frequency and/or in a specific direction relative to the node). Informational data points are not singularly useful for providing situational awareness but may be used to derive elements of content in the aggregate through spectrum fusion. The fusion of informational data points to derive those content elements is data-exchange intensive in a MANET that may already have limited bandwidth availability; and it is slow and cumbersome to derive content elements as informational data points are propagated up the hierarchical structure for centralized processing, and then content elements are propagated back down.

Spectrum fusion based on analyzing spectrum sensing information collected within a single network for cooperative distributed dynamic spectrum access is common with MANET. Commercial wireless technology such as 5G includes dynamic spectrum management techniques with other types of fusion; however military communications systems and commercial systems with heterogeneous hierarchical MANETs require a different methodology of spectrum fusion.

SUMMARY

In one aspect, embodiments of the inventive concepts disclosed herein are directed to systems and methods for deriving content elements from a plurality of informational data points via spectrum fusion at each hierarchical level of a large scale hierarchical and heterogeneous networks, and specifically mobile ad-hoc networks (MANETs). Content elements may be derived via fusion of information data from peer nodes and/or from upper and/or lower hierarchical nodes.

In a further aspect, content elements are propagated up for further abstraction at higher hierarchical levels. For example, a content element at a lower hierarchy can be interference, which could be abstracted as the node location and the direction of the external interference. The node location and external reference direction facilitate fusion at each hierarchical level where the deriving node is receiving content elements from a plurality of different nodes.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles. In the broad view, this disclosure is in part about tying fusion to information abstraction such that the battlefield RF situational awareness, at any hierarchical level, is not compromised by the lack of bandwidth to communicate RF sensing information.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to systems and methods for deriving content elements from a plurality of informational data points via spectrum fusion at each hierarchical level of a large scale hierarchical and heterogeneous networks, and specifically mobile ad-hoc networks (MANETs). Content elements may be derived via fusion of information data from peer nodes.

Figure 1:
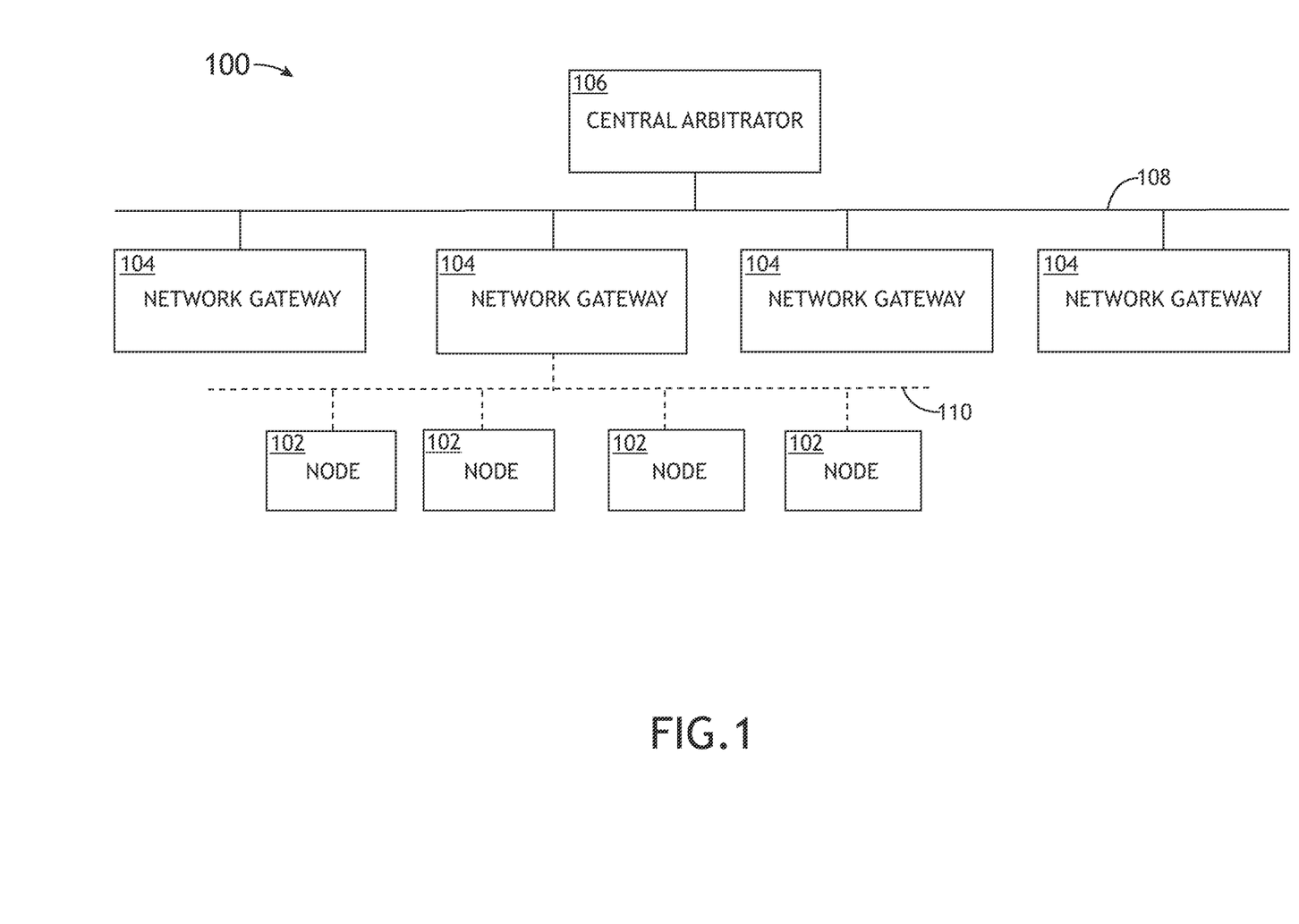
FIG. 1 shows a hierarchical heterogeneous network environment suitable for implementing exemplary embodiments of the present disclosure.

Referring to FIG. 1, a hierarchical heterogeneous network environment suitable for implementing exemplary embodiments of the present disclosure is shown. The network 100 is a hierarchical heterogeneous network with a central arbitrator 106 at the highest hierarchical point where network management utilities are used. Spectrum information fusion may be performed at a node 102 in the network 100, a gateway node 104, or the central arbitrator 106.

In at least one embodiment, the central arbitrator 100 is connected to one or more gateway nodes 104 via a first control plane 108. Likewise, each gateway node 104 may be connected to one or more nodes 102 via a second control plane 110. Each of the entities 102, 104, 106 may be operated according to a particular spectrum fusion rule set, either specific to the entity 102, 104, 106, or to the hierarchical level of the entity 102, 104, 106. For example, gateway nodes 104 may be operated in control of, and in communication with nodes 102 according to spectrum fusion rule set that receives fused content elements from nodes 102 and neighboring gateway nodes 104. In at least one embodiment, the gateway nodes 104 may operate in a cooperative distributed manner with other gateway nodes 104 using another rule set for cooperative distributed spectrum fusion. The same network gateway node 104 may overrule content elements from nodes 102 or neighboring gateway nodes 104 based on recency of fused content elements.

In at least one embodiment, each node 102 may define a methodology for spectrum information fusion with peer nodes 102 through the second control plane 110. In at least one embodiment, each node 102 receives informational data points from the peer nodes 102 and performs spectrum fusion individually. Alternatively, or in addition, each node 102 performs spectrum fusion on spectrum information particular to the nodes 102, and then transmits the fused content elements to the peer nodes 102 without the informational data points. Fused content elements may be propagated up to the next higher hierarchical level.

In at least one embodiment, each peer node 102 may make spectrum allocation decisions, individually or cooperatively, according to a distributed spectrum allocation algorithm.

It may be appreciated that in some embodiments, the central arbitrator 106 and the gateway nodes 104 perform spectrum fusion at their own hierarchical level based on fused content elements received from the next lowest hierarchical level and any informational data points specific to the current level (and any fused content elements of those informational data points). Such fused content elements may be propagated downstream.

It may be appreciated that each entity 102, 104, 106 comprises a cognitive engine configured to produce informational data points and receive content elements from lower level entities 102, 104, 106, and execute the information fusion algorithm for each hierarchical level as entities 102, 104, 106 may be promoted and demoted according to the organization methodology of the MANET.

Figure 2:
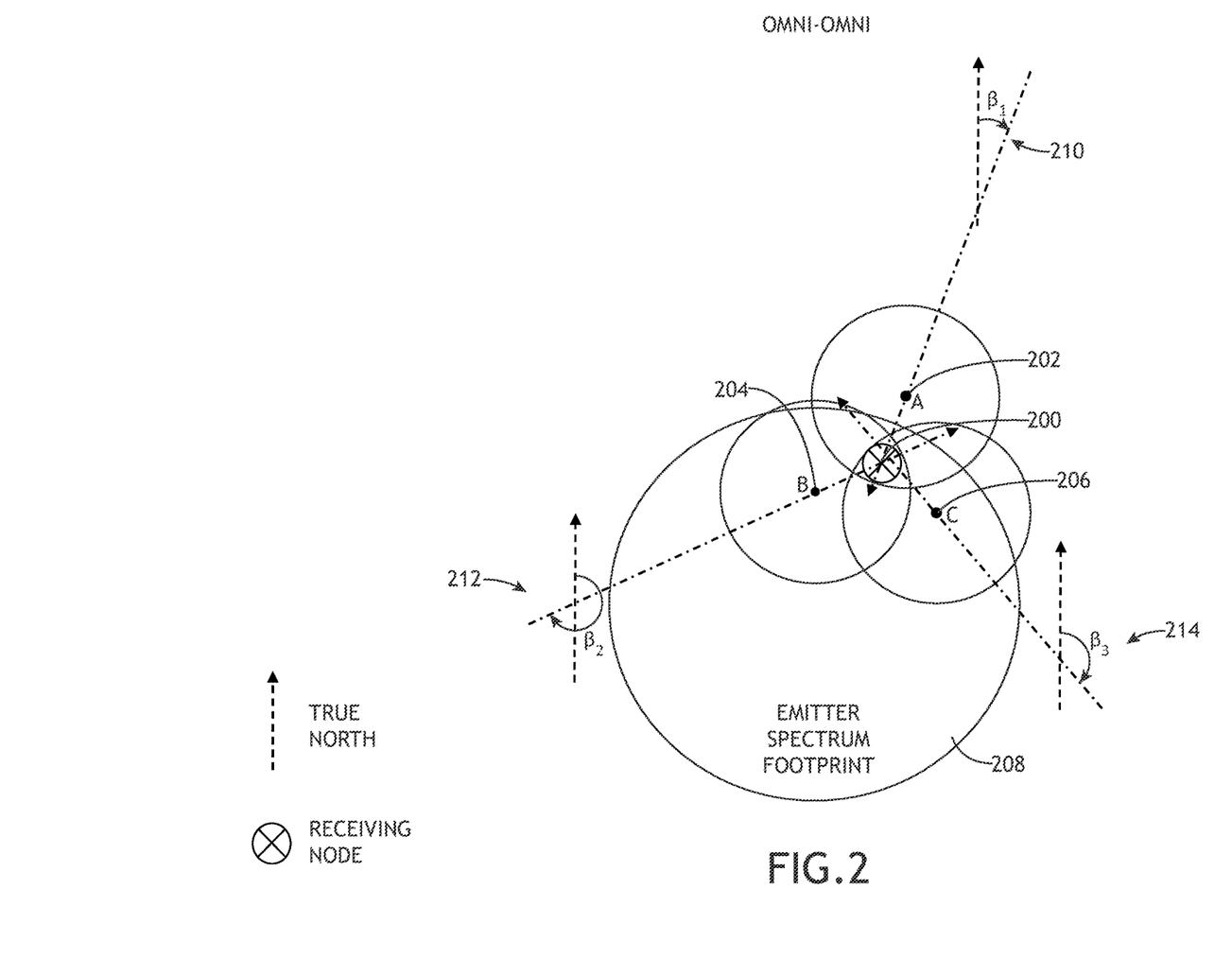
FIG. 2 shows a block diagram of nodes in a MANET using omnidirectional antennas detecting an omnidirectional emitter.

Referring to FIG. 2, a block diagram of nodes 200, 202, 204, 206 in a MANET using omnidirectional antennas detecting an omnidirectional emitter is shown. A receiving node 200 is in data communication with three other peer nodes 202, 204, 206 via RF signals utilizing omnidirectional antennas. The nodes 200, 202, 204, 206 are operating in an environment including an emitter source 208 of unknown properties.

In at least one embodiment, the receiving node 200 receives a signal from a first node 202 including the receiving signal direction 210 expressed in terms of an absolute, external reference such as "true north" with an angle $\beta_1$. Likewise, the receiving node 200 receives a signal from a second node 204 including the receiving signal direction 212 expressed in terms of the same external reference with an angle $\beta_2$. Furthermore, in at least one embodiment, the receiving node 200 receives a signal from a third node 206 including the receiving signal direction 214 expressed in terms of the same absolute, external reference with an angle $\beta_3$.

Signal degradation may be quantized according to a uniform (for example 1-10, with minimal degradation between 1-3, moderate degradation between 4-6, and high degradation between 7-10). Such quantization may be derived via a weighted function considering a propagation model and antenna characteristics. Common factors in the spectrum calculation is the receiver antenna gain, the transmit antenna gain, and other antenna characteristics known in calculating the received signal spectrum status.

What differ between using an omni-directional antenna and a direction antenna is that directional antennas has a defined antenna pointing direction while omni-directional antennas has no definition of an antenna pointing direction. In the case of directional antennas the antenna pointing direction matters because signal interference is calculated based on the transmitted signal power and distance (we can assume free space propagation or any other type of propagation model). Transmit signal power with directional antennas naturally decrease as the angle points further from the direction of the destination node. The receiving node calculates the distance the signal traveled and the relative transmit power (in case of omni-directional antennas, it is the same as the transmit power and in case of directional antennas it a function of the antenna pointing angle) and decides the level of interference the receiving node has encountered.

In one example, signal degradation from the first node 202 may be minimal; signal degradation from the second node 204 may be high; and signal degradation from the third node 206 may be moderate. Spectrum fusion may be performed at the receiving node 200 as a function of degradation level with respect to signal direction 210, 212, 214 relative to the external reference (true north). The receiving node 200 may thereby aggregate spectrum information (signal strength and direction) to produce a content element (an estimate of the emitter 208 location or general direction with respect to the receiving node 200). The content element may have a corresponding accuracy level according to the amount of information used to produce it, or other metrics. This accuracy may increase with the presence of more peer nodes 202, 204, 206.

In at least one embodiment, a gateway node receiving corresponding content elements from different nodes 200, 202, 204, 206 can create a more accurate estimation of where the emitter 208 is in relation to the network footprint. It may be appreciated that the gateway node may perform similar spectrum fusion processes on content elements received from each of the receiving node 200 and peer nodes 202, 204, 206, even within the limited network shown, were each node 200, 202, 204, 206 acts as a receiving node 200 with respect to its peers 200, 202, 204, 206. Furthermore, it may be appreciated that while the methodology is described with respect to the lowest, network node level, the principles are equally applicable to gateway nodes and central arbitrators.

Figure 3:
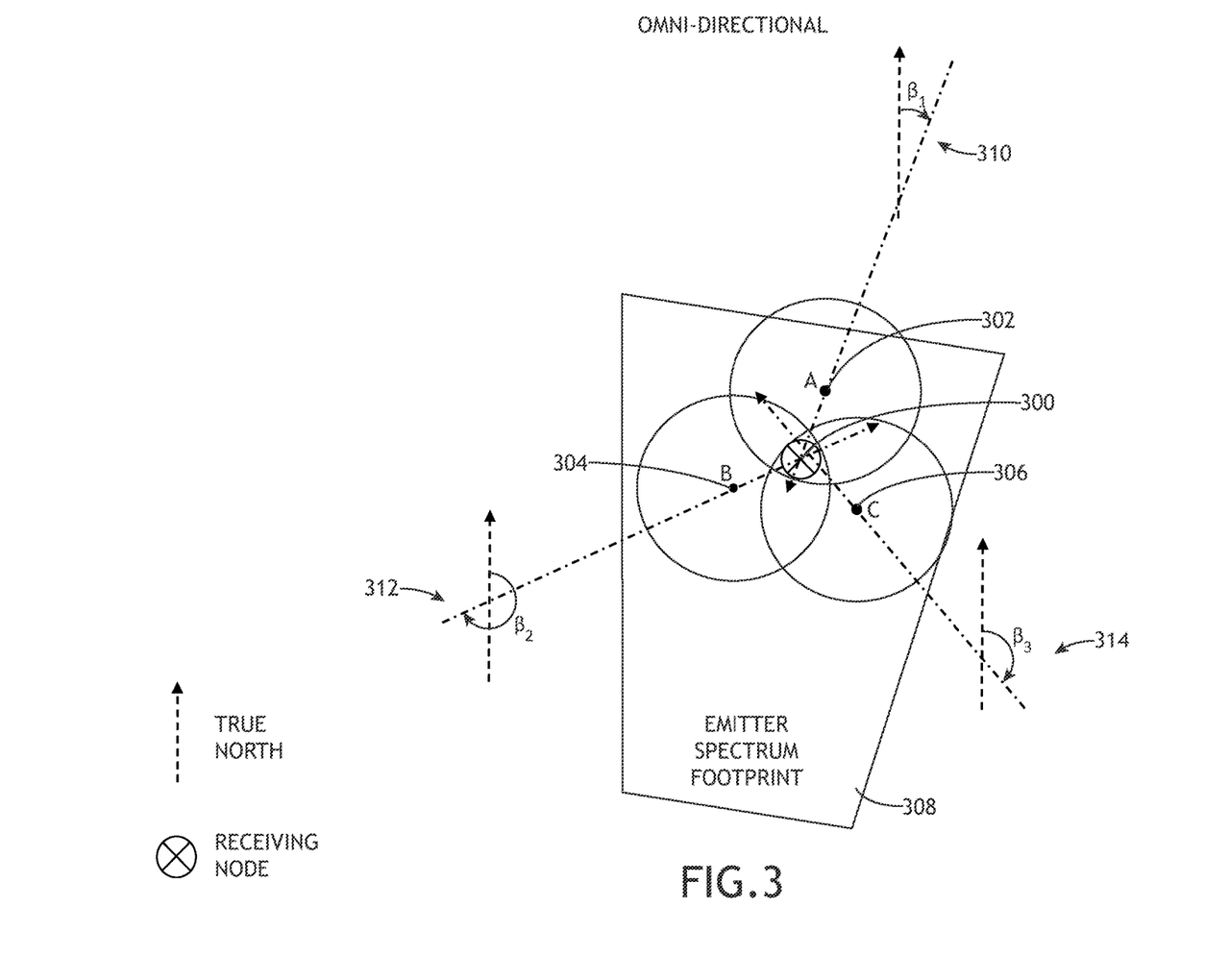
FIG. 3 shows a block diagram of nodes in a MANET using omnidirectional antennas detecting a directional emitter.

Referring to FIG. 3, a block diagram of nodes in a MANET using omnidirectional antennas detecting a directional emitter is shown. In certain military networks, the nodes may use omnidirectional antenna while a jammer uses a directional signal directed to where an enemy determines the MANET is operating. In at least one embodiment, the receiving node 300 receives a signal from a first node 302 including the receiving signal direction 310 expressed in terms of an absolute, external reference with an angle $\beta_1$, a signal from a second node 304 including the receiving signal direction 312 expressed in terms of the same external reference with an angle $\beta_2$, and a signal from a third node 306 including the receiving signal direction 314 expressed in terms of the same absolute, external reference with an angle $\beta_3$. In the present case, signal degradation from the first node 302, second node 304, and third node 306 may be substantially similar.

Spectrum fusion may be performed at the receiving node 300 as a function of degradation level with respect to signal direction 310, 312, 314 relative to the external reference (true north). The receiving node 300, with no knowledge of the characteristics of the emitter 308, may determine that a directional emitter is likely 308 based on the divergent nature of the peer nodes 302, 304, 306 but the substantially similar signal degradation. If the standard deviation of the quantized degradation values from the peer nodes 302, 304, 306 is high, the fusion process may produce a content element hypothesizing an omni directional emitter (which may be benign—i.e., a commercial signal). Alternatively, if the standard deviation is low, the fusion process may produce a content element hypothesizing a directional emitter (which is likely to be malicious—i.e., jammer). In such example, the content element may include the direction of the emitter 308 but with a lower confidence level.

In at least one embodiment, spectrum fusion at the node level produces a content element comprising a confidence level of a location (or direction) and a type of interference source. Such content element consumes substantially less bandwidth than all of the informational data points used in the fusion process, and may be useful for situational awareness at each hierarchical level.

Figure 4:
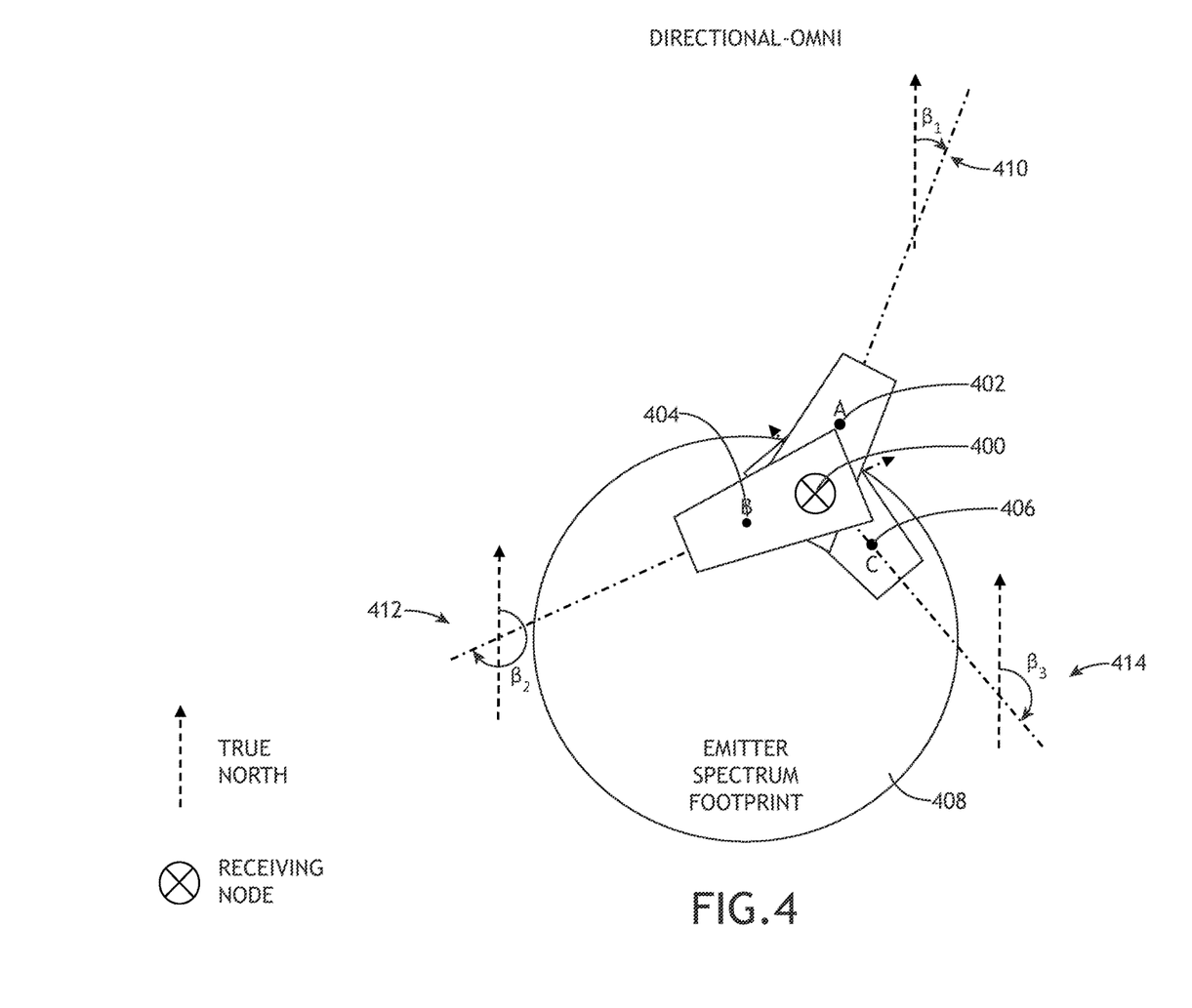
FIG. 4 shows a block diagram of nodes in a MANET using directional antennas detecting an omnidirectional emitter.
Figure 5:
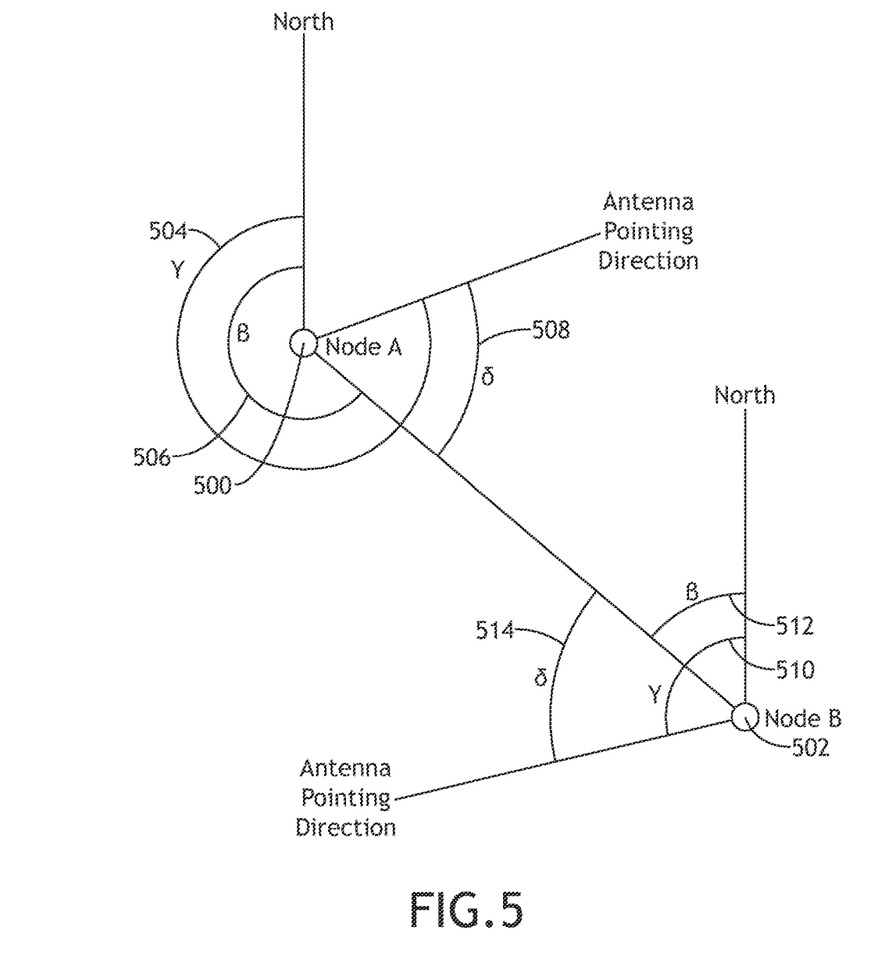
FIG. 5 shows a block diagram of signal directionality useful for fusing information according to an exemplary embodiment.

Referring to FIGS. 4 and 5, a block diagram of nodes 400, 402, 404, 406 in a MANET using directional antennas detecting an omnidirectional emitter and a block diagram of directional antenna detection are shown. Some military MANETs may resort to directional antennas to achieve low probability of detection (LPD) and low probability of interception (LPI). In at least one embodiment, the receiving node 400 receives a signal from a first node 402 including the receiving signal direction 410 expressed in terms of an absolute, external reference with an angle $\beta_1$, a signal from a second node 404 including the receiving signal direction 412 expressed in terms of the same external reference with an angle $\beta_2$, and a signal from a third node 406 including the receiving signal direction 414 expressed in terms of the same absolute, external reference with an angle $\beta_3$. In the present case, signal degradation from the first node 402, second node 404, and third node 406 may be substantially similar.

In at least one embodiment, the nodes 400, 402, 404, 406 may encounter an omni-directional emitter 408 using the same frequency, such as a commercial network. Where the nodes 400, 402, 404, 406 emit directional beams, the directional beam may be able to overcome higher interference level as the RF energy is focused towards the receiving node 400.

In at least one embodiment, when correlating the informational data points of two or more nodes 500, 502, a spectrum fusion process may utilize the antenna pointing direction γ 504, 510, relative to an external reference such as north, the bearing β506, 512 of the other node, relative to the external reference, and the angle δ 508, 514 between the pointing direction γ 504, 510 and the targeted node 500, 502. In at least one embodiment, the fusion process may also utilize transmit power, transmit antenna gain, receive antenna gains, and distance between the transmit and receive nodes 500, 502. Furthermore, for directional antennas, the fusion process to consider the absolute value of the difference between the pointing direction γ 504, 510 of the receive antenna and the bearing β506, 512 to the transmit node 500, 502. Also, the fusion process may utilize the absolute value of the difference between the pointing direction γ 504, 510 of the transmit antenna and the β506, 512 to the receive node 500, 502. These absolute values may be critical as the transmit antenna pointing direction γ 504, 510 will not always be perfect. That is, the highest RF signal power is not pointed to the receive node 500, 502 perfectly. The bearing β 506, 512 to the transmit node 500, 502 and the bearing β 506, 512 to the receive node 500, 502 may be included in the fusion calculation in order to accurately estimate the RF signal degradation.

Figure 6:
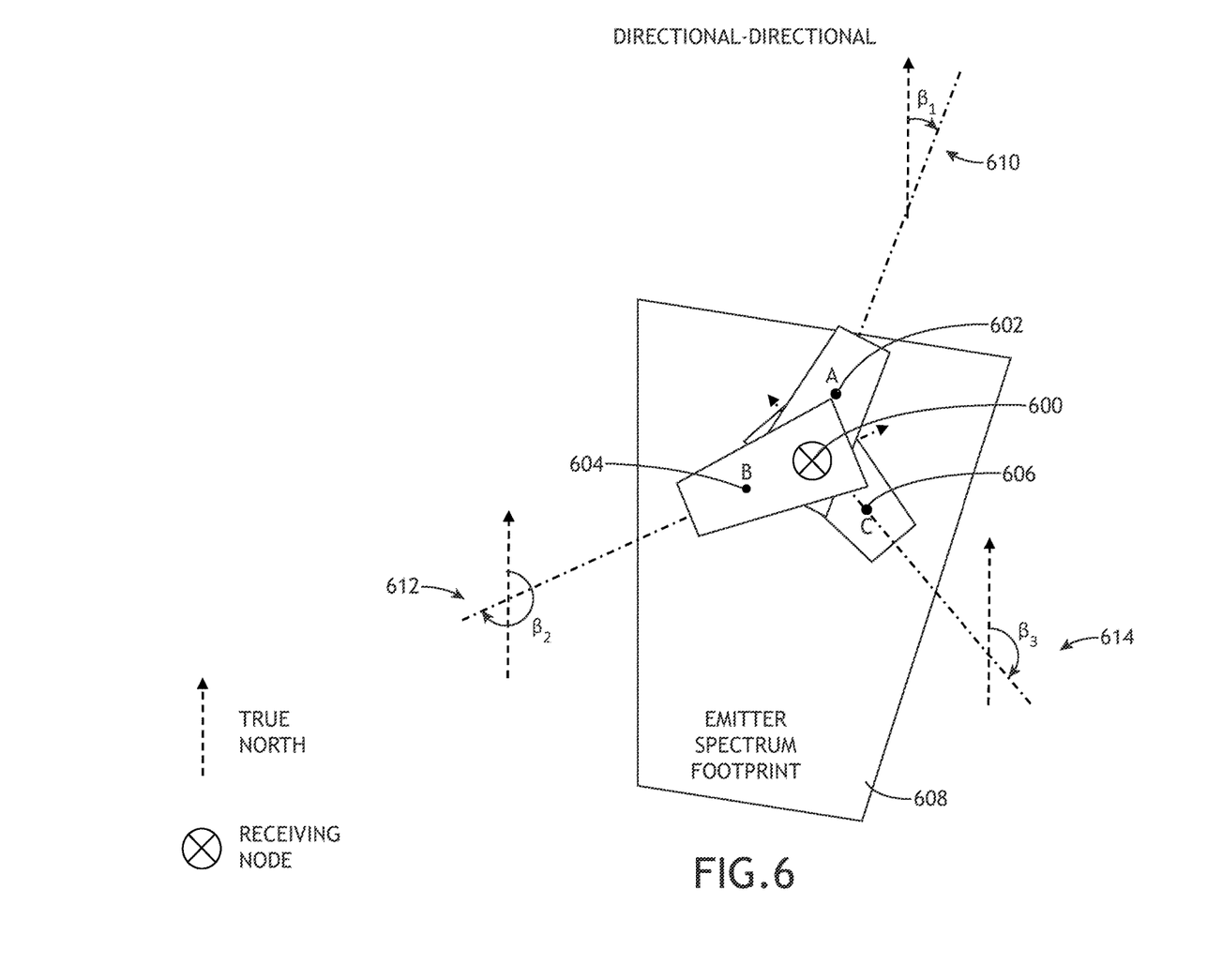
FIG. 6 shows a block diagram of nodes in a MANET using directional antennas detecting a directional emitter.
Figure 7:
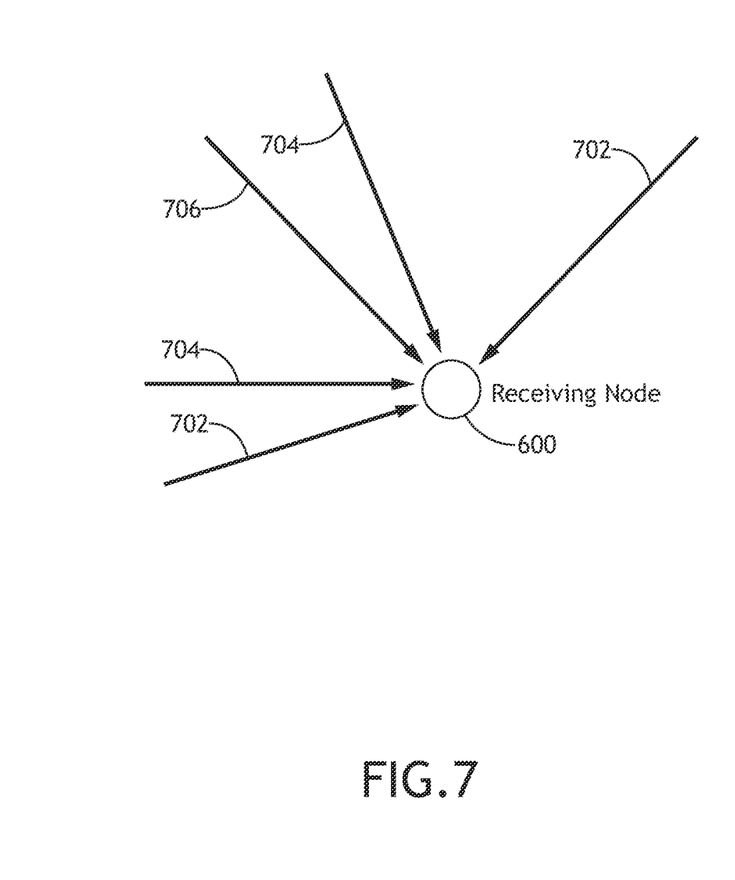
FIG. 7 shows a block diagram of informational data points at a node.

Referring to FIGS. 6 and 7, a block diagram of nodes 600, 602, 604, 606 in a MANET using directional antennas detecting a directional emitter and a block diagram of content elements derived via spectrum fusion are shown. In military communications systems utilizing directional antennas for LPD/LPI, a jammer may concentrate the jamming signal spectral density towards the targeted MANET area. In at least one embodiment, the receiving node 600 receives a signal from a first node 602 including the receiving signal direction 610 expressed in terms of an absolute, external reference with an angle $\beta_1$, a signal from a second node 604 including the receiving signal direction 612 expressed in terms of the same external reference with an angle $\beta_2$, and a signal from a third node 606 including the receiving signal direction 614 expressed in terms of the same absolute, external reference with an angle $\beta_3$. In the present case, the process at the receiving node 600 is substantially similar to the process set forth in FIGS. 4 and 5, giving the receiving node 600 some spectrum awareness content with respect to peer nodes 602, 604, 606.

In at least one embodiment, spectrum awareness content determined at each node 600, 602, 604, 606 are combined. Spectrum fusion of content from different peer nodes 600, 602, 604, 606 may utilize a digitized status of the received content from each node 600, 602, 604, 606 through a scale such that one end of the scale expresses a good signal 702 that is the best it can be (perfect free space propagation relative to all the known information), while the other end of the scale expresses a severely degraded signal 706. Based on such digitized scale, the receiving node 600 may fuse spectrum content from the peer nodes 602, 604, 606 with respect to different locations relative to the absolute reference. The receiving node 600 may create fused content elements that express spectrum degradation with respect to different angles of reception; for example, one or more good signals 702 are associated with certain angles of reception, one or more moderate signals 704 are associated certain angles, and one or more severely degraded signals 706 are associated with certain angles. This fused content indicates a specific angle where interference is most severe; such content may be expressed as a function of increasing interference as the angle of reception approaches the specific angle. Each node 600, 602, 604, 606 may have a general knowledge of the direction of interference and the interfering emitter 608.

In at least one embodiment, the fused content propagates between peer nodes 600, 602, 604, 606. Each node 600, 602, 604, 606 fuses content from peer nodes 600, 602, 604, 606 to more accurately identify the location of the emitter 608. Fused content from each node 600, 602, 604, 606 is further propagated to a gateway node. The gateway node may perform a more comprehensive content fusion to create an abstracted view of spectrum status corresponding to GPS location points where interference is sourced. It may be appreciated that the content from each node 600, 602, 604, 606 requires significantly less bandwidth than the corresponding information data points to transmit to the gateway node, and that each content element is individually useful for situational awareness.

Figure 8:
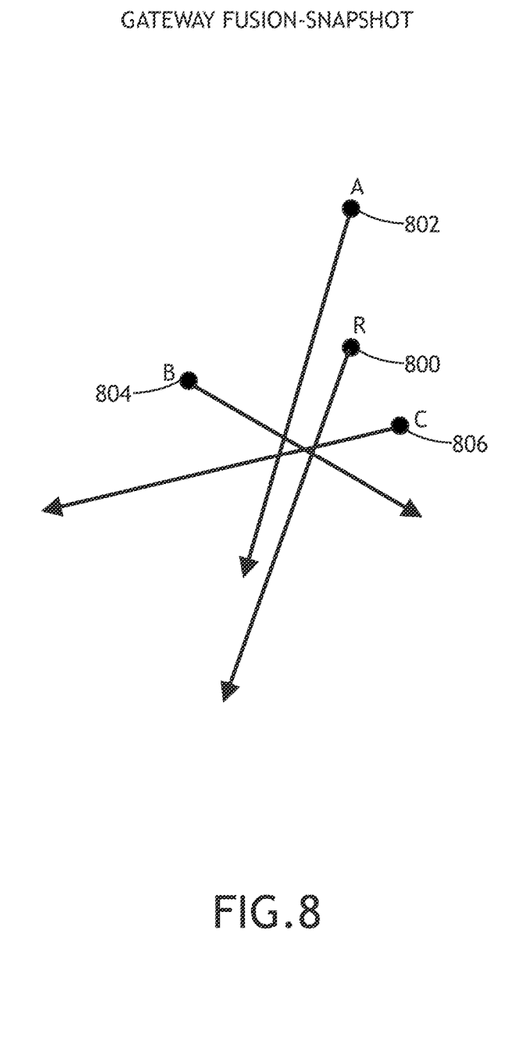
FIG. 8 shows a block diagram of a content element derived at a gateway node hierarchical level.
Figure 9:
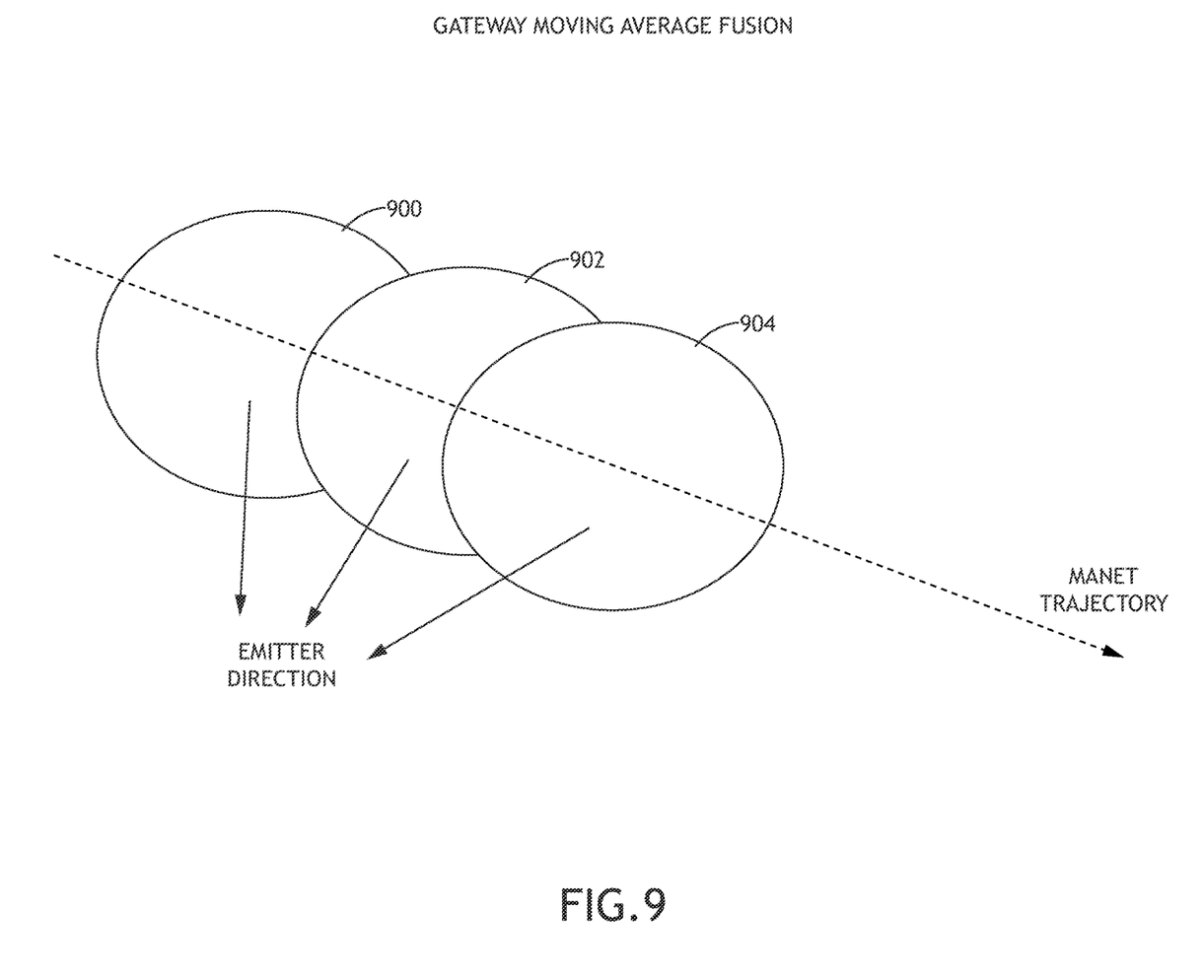
FIG. 9 shows a block diagram of content elements derived via spectrum fusion over time.

Referring to FIGS. 8 and 9, a block diagram of a content element derived at a gateway node hierarchical level and a block diagram of content elements derived via spectrum fusion over time are shown. In at least one embodiment, gateway level abstracted content may comprise a GPS location, a digitized level of interference emitting from that location, and an indication directionality or omnidirectionality. Abstracted content may be propagated to peer gateway nodes and to a central arbitrator. It may be appreciated that gateway level abstraction reduces the volume of spectrum content on the network while increasing the situational awareness density of the content. Furthermore, because content fusion occurs first at low levels and then propagates upward, bandwidth usage is reduced at higher hierarchical levels where bottlenecks are most likely.

In at least one embodiment, the gateway node first performs a snapshot fusion where content from different nodes in the network is fused at a given point in time. This snapshot fusion may create an estimate of the collective content of all the nodes 800, 802, 804, 806. The gateway node receives content from all nodes 800, 802, 804, 806 where each node 800, 802, 804, 806 was a "receiver node" (as described in FIGS. 2-7) at one point-in-time. Such content may comprise an estimated direction of an interference source, a quantized level of degradation, and/or a confidence level. Some nodes 800, 802 may supply content with a more accurate estimation of the interference direction while other nodes 804, 806 may supply content with a skewed direction of estimation. The gateway node may fuse the supplied content to an estimated direction of emission based on all the supplied content with respect to a weighted function of the supplied interference directions, quantized level of degradation, and confidence level; thereby producing more accurate, abstracted content.

In at least one embodiment, abstracted content 900, 902, 904 produced via snapshot fusion at different points of time may be used to pin-point the emitter direction with great accuracy. Fusion of abstracted content 900, 902, 904 over time may increase the confidence level in the emitter type, interference level, and power spectral density, as well as the direction. Furthermore, the gateway node may determine if the emitter is benign or malicious (for example, omnidirectional or directional) with high confidence.

In at least one embodiment, each gateway node receives abstracted content from peer gateway nodes. Such peer abstracted content may also be fused to provide a more comprehensive view of the theater. Fused abstracted content may be propagated to a central arbitrator.

The central arbitrator may fuse abstracted content from all gateway nodes for more comprehensive theater level content of the spectrum status than is possible from any single gateway node as gateway nodes may not receive abstracted content from all peer gateway nodes, but the central arbitrator is expected to receive a larger set of abstracted content. The central arbitrator may use the theater level content to make frequency assignments between the different networks to avoid interference areas of specific frequencies.

Figure 10:
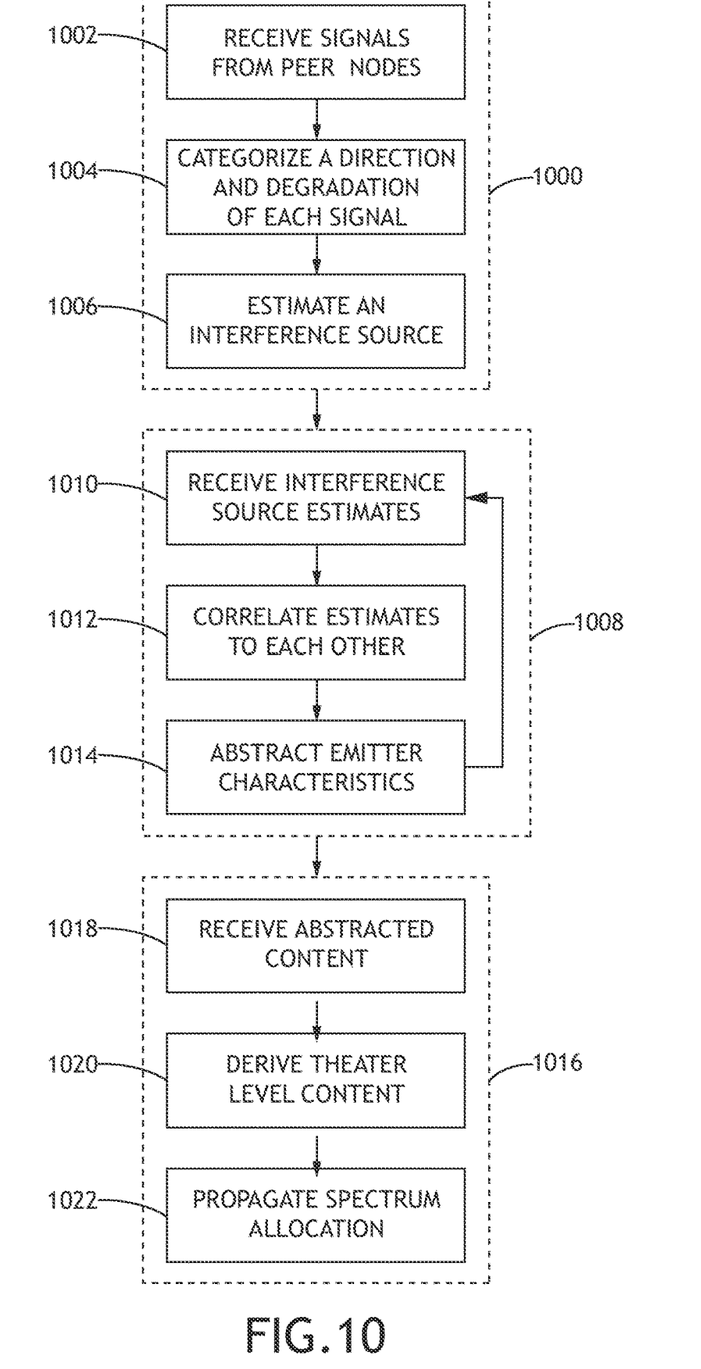
FIG. 10 shows a flowchart of a method for hierarchical information fusion according to an exemplary embodiment.

Referring to FIG. 10, a flowchart of a method for hierarchical information fusion according to an exemplary embodiment is shown. At a node level 1000, each node may receive 1002 signals from peer nodes and categorize 1004 those signals according to direction and strength or degradation. Based on those categorizations 1004, the node estimates 1006 certain characteristics of an interference source. Such characteristics may comprise a direction with reference to the location of the node and some external reference such as true north, an emitter type (directional or omnidirectional), an operating frequency range and power or spectrum density, and/or a confidence level of the estimates.

In at least one embodiment, at a gateway level 1008, each gateway node receives 1010 content from one or more nodes in data communication with the gateway node, the content comprising the estimated characteristics at one or more singular points in time. The content estimates are correlated 1012 according to the estimated characteristics and emitter characteristic are abstracted 1014 to determine a more accurate and complete estimate; the abstracted 1014 content estimates may be time stamped for future correlation. Furthermore, additional content from the one or more nodes may be received 1010 at different points in time so that abstracted content over time may be correlated 1012 to derive more and more accurate abstracted 1014 content.

In at least one embodiment, at a central arbitrator level 1016, the central arbitrator receives 1018 abstracted content from one or more gateway nodes. The abstracted content is correlated and fused to derive 1020 one or more theater level content elements; for example, locations and characteristics of multiple interfering emitters. The central arbitrator may utilize the theater level content to determine a new spectrum allocation and propagate 1022 the spectrum allocation to gateway nodes and lower level nodes.

At each level 1000, 1008, 1016, the entities in that level 1000, 1008, 1016 may utilize the fused content to make local spectrum allocation decisions based on a propagated rule set. For example, where fused content at the node level 1000 indicates an interfering emitter, the node may make a spectrum change and communicate that change to peer nodes and a corresponding gateway node along with the content used to make the decision to change the spectrum. At the gateway level 1008, the gateway node may determine, based on a local gateway level 1008 rule set, whether the spectrum change was appropriate. Furthermore, based on the increased level of situational awareness provided by abstracted content at the gateway level 1008, the gateway nodes are in a better position to analyze spectrum allocation.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A mobile ad-hoc network comprising:
   at least one central arbitrator;
   at least one gateway node in data communication with the at least one central arbitrator; and
   at least one network node in data communication with the at least one gateway node,
   wherein:
   the at least one network node is configured to:
      process a plurality of information data points comprising signal characteristics to derive at least one content element; and
      transmit the at least one content element to the at least one gateway node without transmitting the plurality of information data points;
   the at least one gateway node is configured to:
      receive a plurality of content elements from the at least one network node; and
      derive an abstracted content element from the plurality of content elements.

2. The mobile ad-hoc network of claim 1, wherein the central arbitrator is configured to:
   receive a plurality of abstracted content elements from the at least one gateway node; and
   derive one or more theater level content elements from the plurality of abstracted content elements.

3. The mobile ad-hoc network of claim 1, wherein the plurality of information data points comprises interfering signal directions and a quantized degradation value.

4. The mobile ad-hoc network of claim 3, wherein:
   the at least one network node is further configured to receive information data points from one or more other network nodes in the mobile ad-hoc network; and
   each network node is configured to derive at least one content element from the information data points, the at least one content element comprising a location or operating frequency range of a jamming source.

5. The mobile ad-hoc network of claim 4, wherein:
   the at least one gateway node is further configured to resolve content elements from different network nodes; and
   the abstracted content elements comprise a combined operating frequency and location of the jamming source.

6. The mobile ad-hoc network of claim 1, wherein the content elements each comprise a location of the deriving network node and an external reference direction.

7. The mobile ad-hoc network of claim 6, wherein deriving the abstracted content elements comprises cross-referencing the location and reference direction of each content element to orient each content element to each other.

8. A node in a mobile ad-hoc network comprising:
   a cognitive engine configured to:
      perform a signal analysis to produce a plurality of information data points comprising signal characteristics;
      process the plurality of information data points to derive at least one content element; and
      transmit the at least one content element to one or more other nodes in the mobile ad-hoc network without transmitting the plurality of information data points.

9. The node of claim 8, wherein the plurality of information data points comprises interfering signal directions and a quantized degradation value.

10. The node of claim 9, wherein:
    the cognitive engine is further configured to:
       receive information data points from one or more other nodes in the mobile ad-hoc network; and
       correlate the information data points to each other based on a location and direction reference; and
    the at least one content element comprising a location or operating frequency range of a jamming source.

11. The node of claim 10, wherein the at least one content element comprises a location of the deriving node and an external reference direction.

12. The node of claim 11, wherein:
    the node comprises a gateway node; and
    the cognitive engine is further configured to:
       receive content elements from a plurality of connected network nodes;
       resolve the content elements against each other based on a corresponding node location and external reference direction; and
       derive an abstracted content element comprising a combined operating frequency and location of the jamming source.

13. The node of claim 12, wherein deriving the abstracted content elements comprises cross-referencing the location and reference direction of each content element to orient each content element to each other.

14. The node of claim 8, wherein:
    the node comprises a central arbitrator;
    the cognitive engine is further derived to:
       receive a plurality of abstract content elements from one or more connected gateway nodes in the mobile ad-hoc network; and derive one or more theater level content elements from the plurality of abstracted content elements.

15. The node of claim 8, wherein each content element comprises an indication of directionality or omnidirectionality.

* * * * *